United States Patent
Holderle et al.

(10) Patent No.: US 7,423,582 B2
(45) Date of Patent: Sep. 9, 2008

(54) DETERMINING A PREDICTED PERFORMANCE OF A NAVIGATION SYSTEM

(75) Inventors: James E. Holderle, Aliso Viejo, CA (US); James A. Keebaugh, Diamond Bar, CA (US); Jeffrey W. Lewellen, West Covina, CA (US)

(73) Assignee: Raytheon Company, Waltham, MA (US)

( * ) Notice: Subject to any disclaimer, the term of this patent is extended or adjusted under 35 U.S.C. 154(b) by 215 days.

(21) Appl. No.: 11/305,172

(22) Filed: Dec. 15, 2005

(65) Prior Publication Data

US 2006/0132358 A1     Jun. 22, 2006

Related U.S. Application Data

(60) Provisional application No. 60/636,839, filed on Dec. 16, 2004.

(51) Int. Cl.
*G01S 1/00* (2006.01)
(52) U.S. Cl. .............................. 342/357.02; 342/357.15
(58) Field of Classification Search .................................
342/357.01–357.17
See application file for complete search history.

(56) References Cited

U.S. PATENT DOCUMENTS

| 5,600,329 A | 2/1997 | Brenner et al. |
| 5,936,573 A | 8/1999 | Smith et al. |
| 2003/0011511 A1* | 1/2003 | King et al. ............. 342/357.02 |
| 2003/0011513 A1* | 1/2003 | Zhao et al. ............. 342/357.09 |
| 2004/0095271 A1 | 5/2004 | Stangeland et al. |
| 2004/0119638 A1 | 6/2004 | Fagan et al. |

OTHER PUBLICATIONS

Search Report and Written Opinion for PCT/US2005/045613 dated Aug. 11, 2006.

* cited by examiner

*Primary Examiner*—Thomas H. Tarcza
*Assistant Examiner*—Nga X Nguyen
(74) *Attorney, Agent, or Firm*—Daly, Crowley, Mofford & Durkee, LLP

(57) ABSTRACT

In one aspect, a method for determining a predicted performance of a navigation augmentation system includes determining a normal performance of the navigation augmentation system and determining a predicted performance of the navigation augmentation system based on determining the normal performance.

In another aspect, a system for determining a predicted performance of a navigation augmentation system includes a long-term monitor for determining a normal performance of the navigation augmentation system and a short-term monitor for determining a predicted performance of the navigation augmentation system based on the normal performance of the navigation augmentation system.

24 Claims, 5 Drawing Sheets

DETERMINING A PREDICTED PERFORMANCE OF A NAVIGATION SYSTEM

CROSS-REFERENCE

This application claims priority to provisional application Ser. No. 60/636,839, titled "PREDICTOR OF NAVIGATION SERVICE AVAILABILITY FOR GPS AND SATELLITE BASED AUGMENTATION SYSTEMS", filed Dec. 16, 2004, which is incorporated herein in its entirety.

TECHNICAL FIELD

The invention relates to navigation systems, and more particularly, to navigation satellite systems.

BACKGROUND

A Global Navigation Satellite System (GNSS) transmits ranging and other signals, which are used by land, sea, and air users to determine a three-dimensional position, a velocity and a time of day. The GNSS includes a network of satellites to transmit the signals to users. One example of a GNSS is the Global Positioning System (GPS). GPS includes a network of 24 or more satellites, called GPS satellites, which operate in medium earth orbit.

The position solutions that GNSS users determine are inaccurate to some extent, due to factors such as errors in satellite ephemeris data, satellite clock drift, ionosphere and troposphere delays, multi-path signals, and receiver noise. In order to determine how large the inaccuracies in their position solutions could be, GNSS users may compute integrity bounds, which are high-assurance bounds for the maximum possible distance errors in their position solutions. Integrity bounds constrain the amount of uncertainty in the position solutions determined by GNSS users. Because the probability is exceedingly small that the errors in a GNSS user's position solution could be greater than the integrity bounds, users are virtually guaranteed that their actual positions are within the integrity-bounded distances of the position solutions that they determine using the GNSS. In general, a navigation system with more integrity allows users to compute smaller integrity bounds, which more closely bound the possible errors, and thus reduce the uncertainty in users' determined positions. The level of integrity provided by a GNSS itself may be insufficient for users to determine integrity bounds that are sufficiently small to meet the requirements for some applications, such as aircraft navigation.

Other systems called augmentation systems generate correction and integrity data, and broadcast the data to users. Users employ the data from the augmentation systems to supplement the data that they receive from the GNSS, in order to increase the accuracy and integrity of their position solutions. The correction data generated by the augmentation system are adjustments that compensate for some of the errors introduced by factors such as those listed above. Users employ the correction data in order to increase the accuracy of their position solutions. The integrity data include values that bound the residual errors that may still remain even after correction data are applied. Users employ the integrity data in order to determine tighter integrity bounds, which reduce the extent of possible inaccuracies remaining in their position solutions.

A typical augmentation system for use with GPS includes one or more reference stations with GPS receivers that receive GPS data from the GPS satellites. The precise locations of the reference station receivers are known. A master control station receives the GPS data collected by the reference stations and determines for each GPS satellite the bias between the expected range to the satellite, based on the known locations of the reference station receivers, and the observed range to the satellite, determined using the GPS data. The master control station also monitors the performance of the GPS satellites and reports anomalies to users, thereby providing increased integrity for GPS users. The master control station generates correction and integrity data that are broadcast to users.

One known type of augmentation system is the satellite-based augmentation system (SBAS). A typical SBAS includes a set of reference stations with GPS receivers at locations throughout the wide geographic area serviced by the SBAS. The correction and integrity data generated by the SBAS master control station are transmitted to one or more geosynchronous earth orbit (GEO) satellites for broadcast to users throughout the wide area on the same frequency and in a similar format to GPS satellites. This method allows signals from the SBAS GEO and the GPS satellites both to be received by the user's GPS receiver, and has the added benefit of providing the SBAS GEO satellites as additional ranging sources to improve availability. Because the SBAS service area is limited by the footprints of the SBAS GEO satellites (which span approximately +/−76 degrees in longitude and latitude) and the quantity and locations of the SBAS reference stations distributed throughout the service area, a single SBAS may provide service to users throughout an entire nation or continent.

Another known type of augmentation system is the ground-based augmentation system (GBAS). A typical GBAS includes a set of reference stations with GPS receivers located within the local area (e.g., 20 or 30 mile radius) serviced by the GBAS. The GBAS master control station generates correction and integrity data, which are broadcast to users in the immediate vicinity of the GBAS via a VHF data link. Because the GBAS service area is limited by the coverage area of the VHF transmitter and by the localized distribution of its reference stations, a single GBAS may be used only within a local area, such as around an airport. Since the GBAS operates in a local area only, it may provide more accurate correction data and more tightly bounded integrity data for that area, and it may alert users to fault conditions more quickly than an SBAS that provides service in the same area.

A further known type of augmentation system, which does not use reference stations at fixed locations, is the air-based augmentation system (ABAS). The ABAS typically uses only the user's own GPS receiver to receive the GPS data from GPS satellites, and it may also supplement the GPS data with data from other equipment, such as an inertial navigation system (INS). The ABAS uses the Receiver Autonomous Integrity Monitoring (RAIM) method to perform integrity monitoring. Since RAIM is based on comparing the results achieved using different combinations of GPS satellites, the ABAS requires more GPS satellites in view than the minimum four required for basic position fixing. Hence, the ABAS gains integrity at the expense of possibly reduced availability.

Authorization for using a GNSS for aircraft navigation is granted by Government and international organizations, which define requirements for different GNSS navigation services that may be used for different types of aircraft navigation (e.g., for different phases of flight). Some GNSS navigation services are supported by the GNSS alone, others are supported by the GNSS supplemented with an augmentation system, such as an SBAS or GBAS. The requirements for each type of GNSS navigation service specify limit thresholds for integrity bounds, which constrain the maximum errors in user position solutions that are allowable when using that type of navigation service. A navigation service is available for a user (i.e., it is approved for use) when the user is able to determine that the integrity bounds are not greater than the threshold limit defined for that service. For example, the requirements for the GNSS navigation service for Category 1 aircraft landings specify that the integrity bound for a user's horizontal position solution be no greater than 40 meters, and the integrity bound for the user's vertical position solution be no greater than 10 meters.

The magnitudes of the integrity bounds determined by a user are dependent on several factors, including the locations of GNSS satellites relative to the user, the current performance of the GNSS and the augmentation system (if applicable), and environmental conditions (e.g., troposphere and ionosphere). These factors typically change over time and vary by user location. It is typical for the integrity bounds determined by the same user at different times to vary, even if the user remains at the same location. It is also typical for the integrity bounds determined at the same time by users at different locations to be different. At any time, a GNSS navigation service may be available to users at some locations (those whose integrity bounds are within the required thresholds), but unavailable to users at other locations (those whose integrity bound exceed the required thresholds).

SUMMARY

In one aspect, a method for determining a predicted performance of a navigation augmentation system includes determining a normal performance of the navigation augmentation system and determining a predicted performance of the navigation augmentation system based on determining the normal performance.

In another aspect, a system for determining a predicted performance of a navigation augmentation system includes a long-term monitor for determining a normal performance of the navigation augmentation system and a short-term monitor for determining a predicted performance of the navigation augmentation system based on the normal performance of the navigation augmentation system.

In a further aspect, the invention is an article comprising a machine-readable medium that stores executable instructions for determining a predicted performance of a navigation augmentation system. The instructions cause a machine to determine a normal performance of the navigation augmentation and to determine a predicted performance of the navigation augmentation system over a second time interval based on determining the normal performance.

DETAILED DESCRIPTION

The ability to predict how navigation systems and navigation augmentation systems will perform in the future is useful, because predictions of navigation system performance may be used to generate navigation service prediction forecasts, which specify when and where navigation services will and will not be available to users. Warnings of upcoming navigation service outages may be used to avoid disruptive and possibly unsafe conditions when navigation services become unavailable to users relying on them for ongoing navigation. Navigation service prediction forecasts allow users to adjust their navigation plans in advance, in order to avoid attempting to use a navigation service in a location when it is expected to be unavailable.

Figure 1:
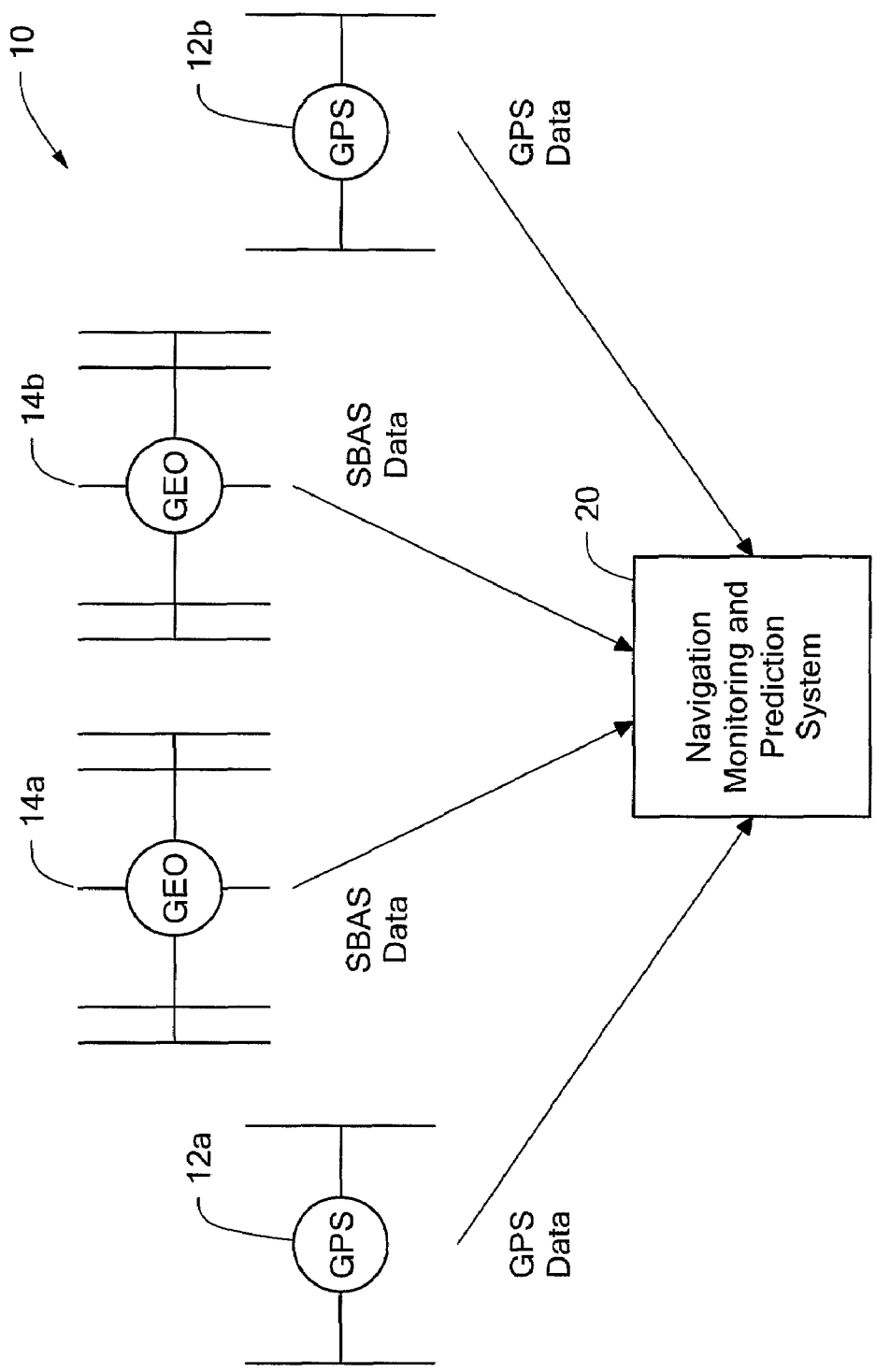
FIG. 1 is a diagrammatic view of a navigation environment.

Referring to FIG. 1, a navigation environment 10 with Global Positioning System (GPS) and satellite-based augmentation systems (SBAS) includes GPS satellites (e.g., GPS satellite 12a and GPS satellite 12b) and geosynchronous earth orbit (GEO) satellites (e.g., GEO satellite 14a and GEO satellite 14b) for one or more SBAS-type augmentation system. Users of SBAS-augmented GPS receive and process the GPS data broadcast by GPS satellites 12a and 12b that are in view (i.e., within line of sight), and also the SBAS data broadcast by SBAS GEO satellites 14a and 14b that are in view. The navigation monitoring and prediction system 20 is used to monitor and to predict the performance of GPS and the SBAS's. The navigation monitoring and prediction system 20 processes the same GPS data and SBAS data that are broadcast to users by the GPS satellites 12a and 12b and the SBAS GEO satellites 14a and 14b. The navigation monitoring and prediction system 20 uses the GPS data and SBAS data to determine the current GPS and SBAS performance, and to determine where GPS and SBAS navigation services are currently available. The navigation monitoring and prediction system 20 also uses the GPS data and SBAS data to predict future GPS and SBAS performance, and to predict when and where GPS and SBAS navigation service will be available in the future. The navigation monitoring and prediction system 20 uses the GPS data broadcast by GPS satellites 12a and 12b and the SBAS data broadcast by the SBAS GEO satellites 14a and 14b that it receives from a single data source to determine the current and predicted future availability of GPS and SBAS navigation services at locations throughout the wide geographic service areas covered by the SBAS GEO satellites.

The navigation monitoring and prediction system 20 described herein is for use with an SBAS; however, the navigation monitoring and prediction system 20 may be used with other types of augmentation systems. Even though the navigation monitoring and prediction system 20 described herein is for use with GPS, the navigation monitoring and prediction system 20 may be used with other types or multiple types of GNSS.

Figure 2:
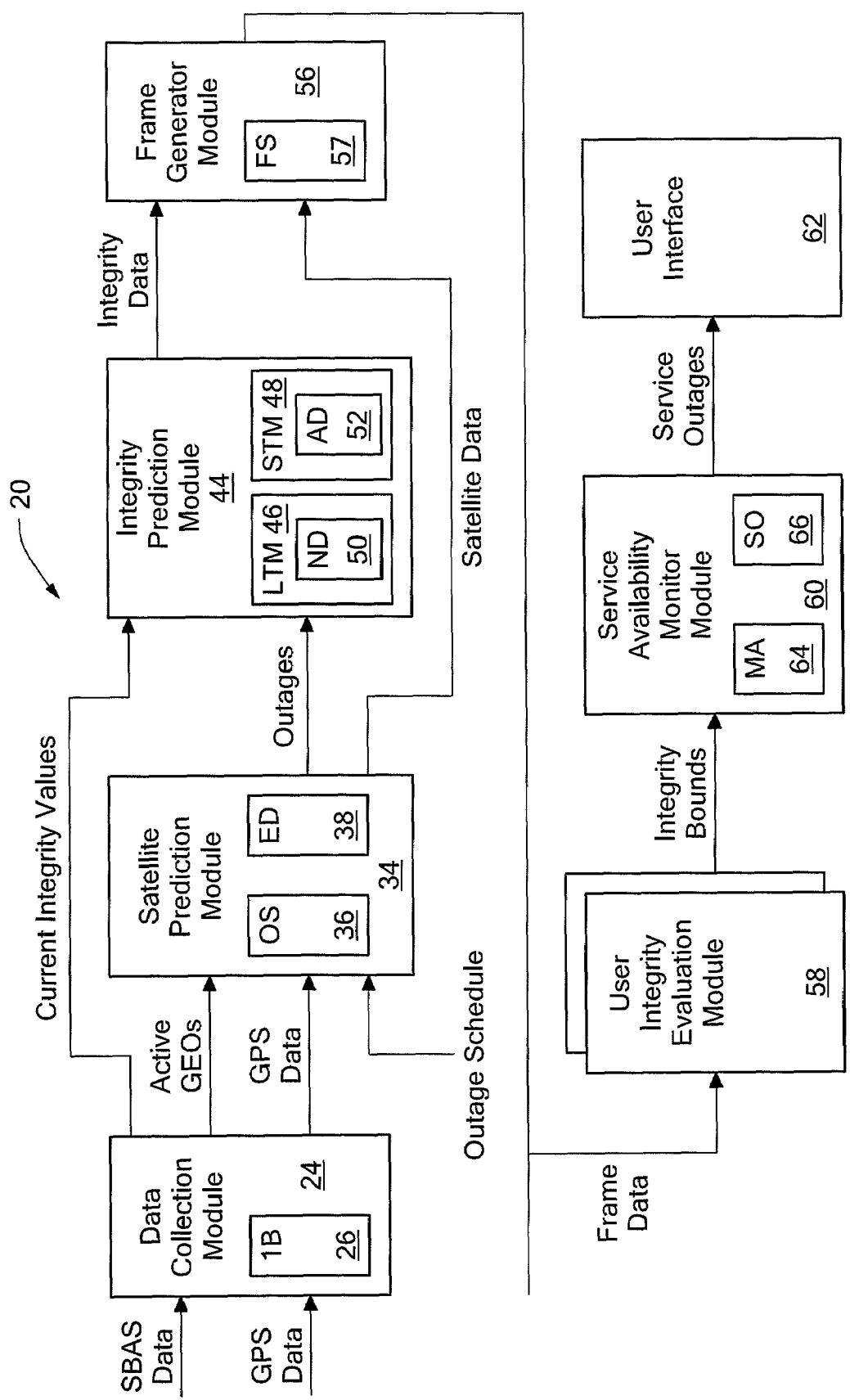
FIG. 2 is a diagrammatic view of a navigation monitoring and prediction system.

Referring to FIG. 2, a navigation monitoring and prediction system 20 includes a data collection module 24, a satellite prediction module 34, an integrity prediction module 44, a frame generator module 56, a user integrity evaluation module 58, a service availability monitor module 60 and a user interface 62. The navigation monitoring and prediction system 20 generates predictions of GPS and SBAS performance, and predictions of the availability of GPS and SBAS navigation services, for times throughout a prediction time window (e.g., from the current time to 72 hours in the future). The prediction time window is divided into prediction time frames of equal length (e.g., one minute). The navigation monitoring and prediction system 20 generates predictions for each prediction time frame in the prediction time window.

The data collection module 24 receives GPS data and SBAS data from a source (e.g., an SBAS-compatible GPS receiver). The GPS data, which include ephemeris data (i.e., orbital parameters) and health status data for each GPS satellite, are routed to the satellite prediction module 34. The SBAS data include integrity data broadcast by each SBAS GEO satellite, consisting of user differential range error indicator (UDREI) data and clock ephemeris covariance matrix (MT28) data for each GPS and SBAS GEO satellite, and grid ionospheric vertical error indicator (GIVEI) data for each ionospheric grid point (IGP) in the IGP mask for each SBAS GEO satellite. The data collection module 24 includes an SBAS data input buffer (IB) 26, in which it stores the SBAS data from each SBAS GEO satellite. The data from each SBAS GEO satellite are processed and stored separately in the SBAS data input buffer 26. The SBAS data input buffer 26 holds data for times throughout the collection time interval, which extends from some time (e.g., 10 minutes) before the current time to some time (e.g., 10 minutes) after the current time. Each SBAS data value is stored in the SBAS data input buffer 26 for the time interval of validity appropriate for that type of data. Degradation of the data values stored in the SBAS data input buffer 26 is performed if new SBAS data values are not received from an SBAS GEO satellite within the expected reporting intervals. Periodically, at the end of each integrity monitoring interval (e.g., one minute), the data collection module 24 processes the data that it has collected in the SBAS data input buffer 26. The data collection module 24 examines the sequence of UDREI and MT28 values collected for each GPS and SBAS GEO satellite throughout the integrity monitoring interval, and the sequence of GIVEI values collected for each IGP, and it reduces each sequence of values to a single representative UDREI, MT28, or GIVEI value for that integrity monitoring interval. The current integrity values, consisting of the representative UDREI, MT28, and GIVEI values for that integrity monitoring interval, are routed to the integrity prediction module 44.

The data collection module 24 provides active GEOs data, identifying the SBAS GEO satellites from which data have been received, to the satellite prediction module 34, which monitors the operational status of the SBAS GEO satellites.

The satellite prediction module 34 monitors GPS and SBAS GEO satellite performance, and generates predictions for GPS and SBAS GEO satellite performance throughout the prediction time window. The satellite prediction module 34 includes a satellite outage schedule (OS) database 36 and an ephemeris database (ED) 38. The satellite outage schedule database 36 includes a set of time intervals for each GPS and SBAS GEO satellite, which indicate the times in the future that the satellite will not be operational. The ephemeris database 38 includes the most recent ephemeris data received for each GPS satellite.

The satellite prediction module 34 uses data from the satellite outage schedule database 36 to predict whether or not each GPS and SBAS GEO satellite will be operational during each prediction time frame throughout the prediction time window. When the satellite prediction module 34 receives updated satellite outage schedule information, it stores the updated information in the satellite outage schedule database 36, and sends notification to the frame generator module 56 to reevaluate integrity prediction results for all prediction time frames within the prediction time window that are affected by the updated outage schedules. Updates to the satellite outage schedule may be entered directly by a user, through a capability provided by the user interface, or may be obtained automatically from a connection to or email from a service that provides information about upcoming satellite outages.

The satellite prediction module 34 monitors the incoming GPS data and active GEOs data and detects inconsistencies between the actual operational status of GPS and SBAS GEO satellites and the expected operational status of the satellites, as indicated by information in the satellite outage schedule database 36. If an unscheduled GPS or SBAS GEO satellite outage is detected, the satellite prediction module 34 generates updated satellite operational predictions that override the inaccurate outage schedule, and it sends notification to the frame generator module 56 to reevaluate integrity prediction results for all affected prediction time frames, so that the unavailable satellite is excluded from prediction evaluations. Likewise, if a GPS or SBAS GEO satellite is found to be operational during a time when an outage for it is scheduled, the satellite prediction module 34 generates updated satellite operational predictions that override the outage schedule, and it sends notification to the frame generator module 56, so that the operational satellite is included in prediction evaluations.

The satellite prediction module 34 uses data from the ephemeris database 38 to predict the location of each GPS and SBAS GEO satellite during each prediction time frame throughout the prediction time window. When the satellite prediction module 34 receives updated satellite ephemeris data, it stores the data in the ephemeris database 38, and sends notification to the frame generator module 56 to reevaluate integrity prediction results for all prediction time frames within the prediction time window that are affected by the updated ephemeris.

The satellite prediction module 34 monitors the incoming GPS data for new GPS satellites. When a new GPS satellite is detected, it is added to the satellite outage schedule database 36 and the ephemeris database 38. The satellite prediction module 34 also times out a GPS satellite when no data from the satellite are received during the timeout period (e.g., 24 hours). Timed out satellites are removed from the satellite outage schedule database 36 and the ephemeris database 38. When a GPS satellite is added or removed, notification is sent to the frame generator module 56 to reevaluate integrity prediction results for all prediction time frames throughout the entire prediction period.

The integrity prediction module 44 monitors integrity data from SBAS GEO satellites, and generates predictions for the integrity data that the SBAS GEO satellites will broadcast to users throughout the prediction time window. The integrity data include user differential range error indicator (UDREI) data and clock ephemeris covariance matrix (MT28) data for each GPS and SBAS GEO satellite, and grid ionospheric vertical error indicator (GIVEI) data for each ionospheric grid point (IGP) in the IGP mask for each SBAS GEO satellite. The integrity prediction module 44 includes a long-term monitor 46, and may also include a short-term monitor 48.

The long-term monitor 46 generates a nominal database (ND) 50, which includes a full set of the normal integrity data values for each SBAS GEO satellite (UDREI and MT28 values for each GPS and SBAS GEO satellite, and GIVEI values for each IGP). The long-term monitor 46 derives the normal integrity data values for each SBAS GEO satellite by monitoring the integrity data that the SBAS GEO satellite has generated in the past. The data in the nominal database 50 are the integrity data values that have been generated most consistently by the SBAS GEO satellite, up through the recent past. If the conditions in the near future are similar to those in the recent past, it is likely that the SBAS GEO satellite will continue to generate the same integrity data values consistently in the future that it generated consistently in the past. If conditions in the near future are expected to be normal (i.e., resembling the conditions that occurred consistently in the recent past), the same normal integrity data values in the nominal database 50, which are based on past SBAS performance, may be used as the values for predictions of future SBAS performance.

The nominal database 50 includes integrity data values for each integrity monitoring interval (e.g., one minute) throughout an entire sidereal day, which is slightly less than 24 hours. The nominal database 50 includes a value for each type of integrity data, for each SBAS GEO satellite, for each integrity monitoring interval in the sidereal day. The orbital period of GPS satellites is one-half of a sidereal day, so the GPS satellites are in nearly the same locations relative to the earth at the same time offset within each sidereal day. An SBAS is likely to generate similar integrity values during the same integrity monitoring interval over subsequent sidereal days, because the same conditions of GPS satellite locations relative to the SBAS reference stations recur during that same interval in each sidereal day.

The long-term monitor 46 continuously monitors the integrity data generated by SBAS GEO satellites, and updates the nominal database 50 as necessary, to keep the normal integrity data in the database consistent with the actual past performance of the SBAS. Because the nominal database 50 includes integrity data values that SBAS GEO satellites are likely to generate in the future, the long-term monitor distinguishes repeatable trends in past SBAS performance from temporary deviations. Values generated in the past by the SBAS GEO satellites during temporary deviations are not likely to recur in the future, but values generated consistently by the SBAS GEO satellites in the past are likely to be generated again in the future. Whenever the nominal database 50 is updated, the long-term monitor 46 sends notification to the frame generator module 56 to reevaluate integrity prediction results for all affected prediction time frames.

The short-term monitor 48 generates an adjusted predictions, which it stores in the adjusted predictions database (AD) 52. The adjusted predictions are used in place of the predictions based on normal integrity values when the short-term monitor 48 detects that unexpected deviations from normal SBAS performance are occurring. The short-term monitor 48 continuously monitors the integrity data generated by SBAS GEO satellites, and compares the integrity data currently being generated to the corresponding normal integrity data values in the nominal database 50. If it detects unexpected deviations from normal SBAS performance, which are not consistent with the schedule of GPS and SBAS GEO satellite outages maintained in the satellite prediction module 34, it generates adjusted predictions and stores them in the adjusted prediction database 52.

The short-term monitor 48 detects when SBAS performance begins to deviate from its expected normal performance, but it may not reliably predict when in the future those deviations will end. Thus, the short-term monitor 48 generates adjusted predictions for the short-term relative to the current time. Deviations that are occurring currently are likely to persist during the immediate future, but it is less certain that the deviations will continue to persist into the more distant future.

The adjusted prediction database 52 generated by the short-term monitor 48 includes the same kinds of integrity data values for each SBAS GEO satellite as the nominal database 50 generated by the long-term monitor, including UDREI and MT28 values for each GPS and SBAS GEO satellite, and GIVEI values for each IGP. The data in the adjusted prediction database 52 are stored for prediction time frames (unlike the data in the nominal database 50, which are stored for integrity monitoring intervals). Whenever the adjusted prediction database 52 is updated, the short-term monitor 46 sends notification to the frame generator module 56 to reevaluate integrity prediction results for all affected prediction time frames.

Figure 3:
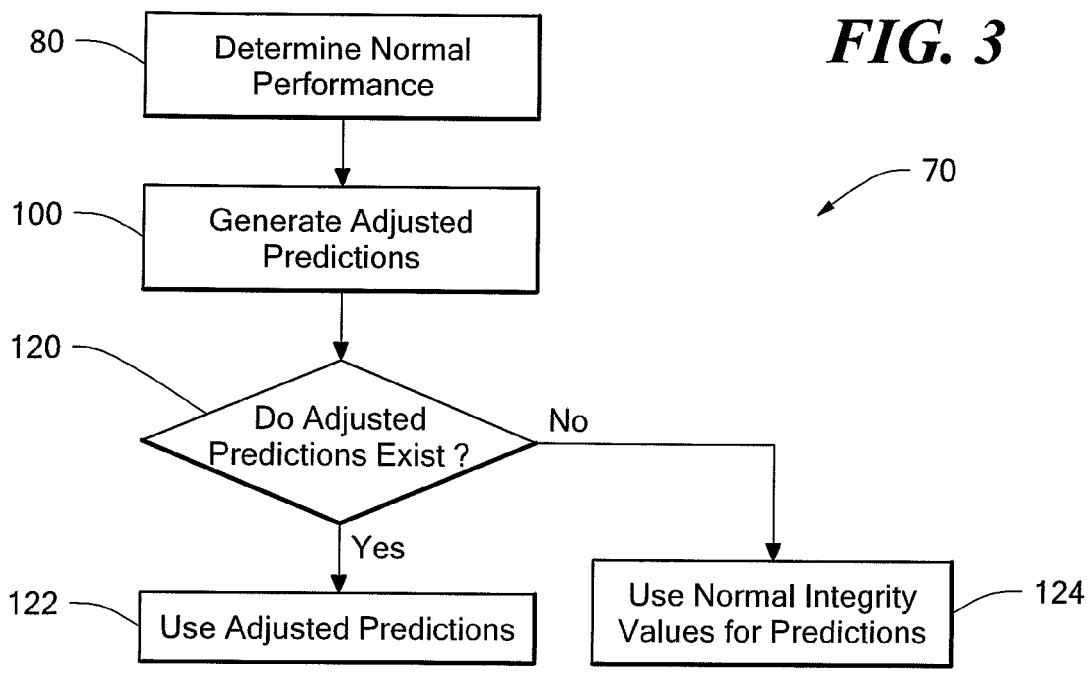
FIG. 3 is a flowchart of a process for monitoring and predicting the performance of a navigation augmentation system.
Figure 4:
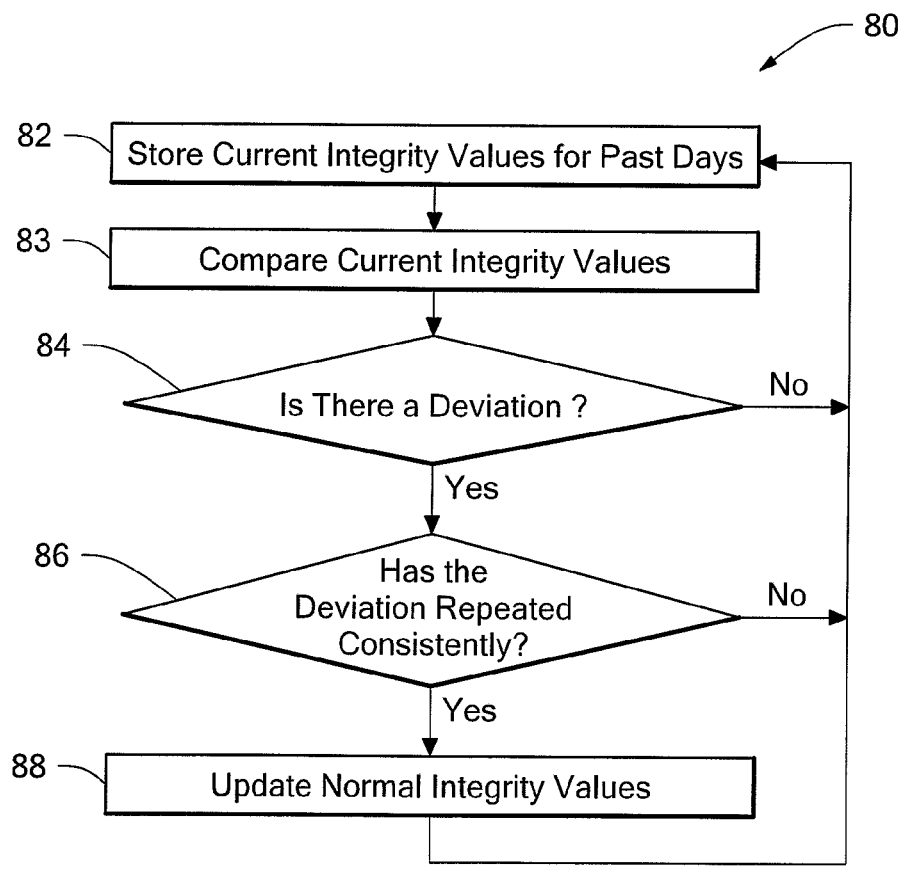
FIG. 4 is a flowchart of a process for long-term monitoring of the navigation augmentation system.

Referring to FIGS. 3 and 4, the integrity prediction module 44 may use a process, for example, a process 70, to predict the future performance of the navigation augmentation system for some time interval. The long-term monitor 46 (FIG. 2) may use an exemplary subprocess 80, and the short-term monitor 48 (FIG. 2) may use an exemplary subprocess 100. If the short-term monitor 48 (FIG. 2) generates adjusted predictions for the time interval, those adjusted predictions are used; otherwise the normal integrity values from the corresponding integrity monitoring interval in the nominal database 46 (FIG. 2) are used for the predicted values.

The long-term monitor 46 (FIG. 2) uses the subprocess 80 (FIG. 4) to monitor the navigation augmentation system performance over an extended past time period, and to derive the normal integrity values that are stored in the nominal database 50 (FIG. 2). Subprocess 80 compares the current integrity values obtained from the data collection module 24 (FIG. 2) to the normal integrity values in the nominal database 50 (FIG. 2) for the same integrity monitoring interval (82). The current integrity values include the integrity values generated during the most recent integrity monitoring interval. Subprocess 80 stores the current integrity values in data structures used to hold the integrity values received during the past several days (e.g., 5 days). Subprocess 80 determines if there is a deviation between the current integrity values and the normal integrity values already stored in the nominal database 50 (84). If there is a deviation, subprocess 80 examines the normal integrity values stored for the past several days and determines if the deviation has been repeating consistently (86). If the deviation has repeated consistently, subprocess 80 updates the normal integrity values (88).

Figure 5:
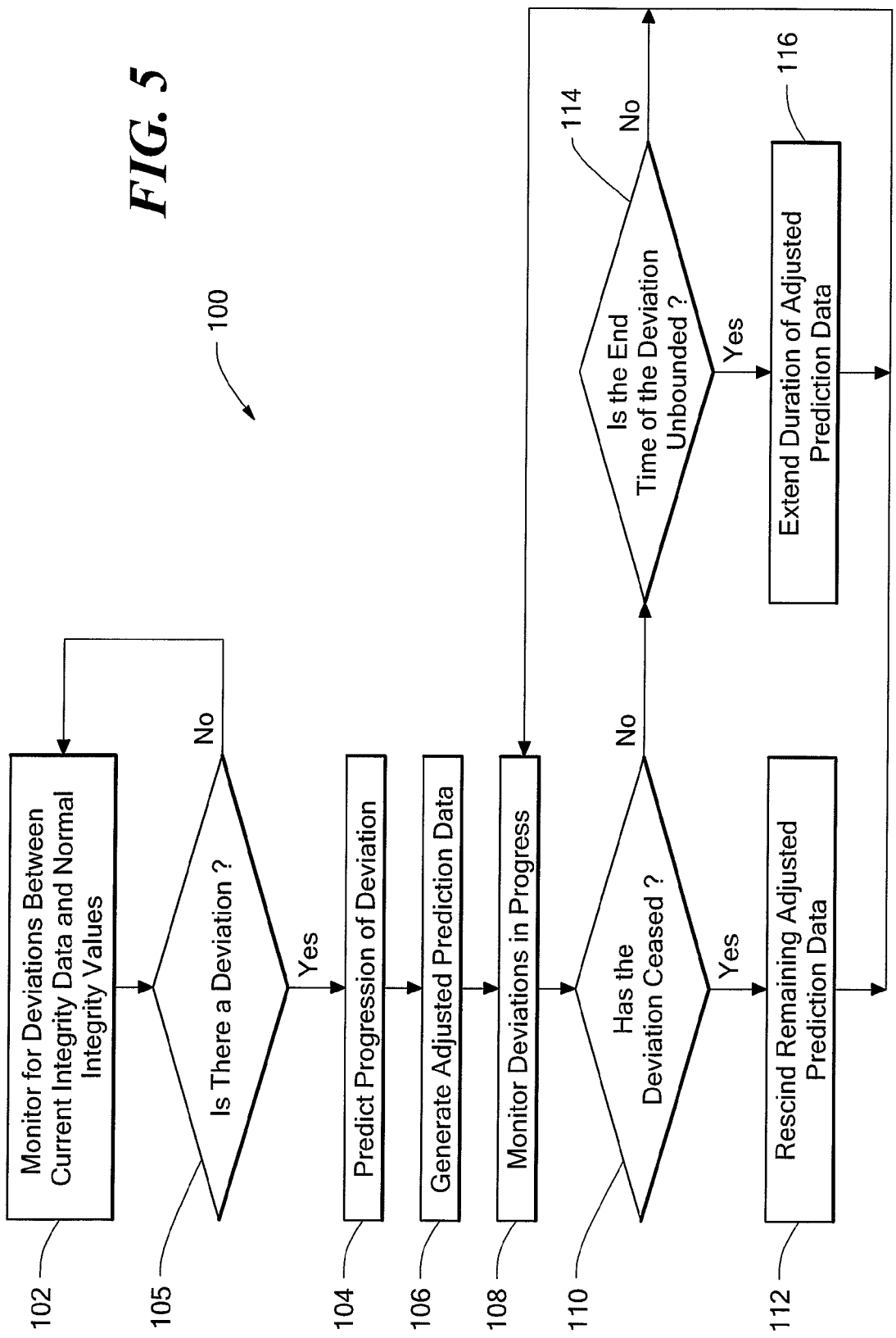
FIG. 5 is a flowchart of a process for short-term monitoring of the navigation augmentation system

Referring to FIG. 5, the short-term monitor 48 uses an exemplary subprocess 100 to detect deviations from the normal performance of the navigation augmentation system, and to generate adjusted predictions that a projection of those deviations throughout some time range into the future. The subprocess 100 monitors the current integrity values obtained from the data collection module 24 (FIG. 2) and compares them to the normal integrity values stored in the nominal database 50 (FIG. 2) to determine if there are any deviations (102). Subprocess 100 predicts a likely progression of the deviations by matching the deviation characteristics against a set of known deviation patterns (104). Subprocess 100 generates adjusted data for intervals in the near future throughout the predicted extent of the deviation (106). Subprocess 100 also monitors deviations in progress for which adjusted predictions have been generated (108). Subprocess 100 examines the current integrity values to determine if the deviation has ceased (110). If the deviation has ceased, subprocess 100 rescinds any remaining adjusted prediction data with respect to that deviation (112). If the deviation is still in progress, and if the deviation is a type of deviation for which the end time is not bounded (114), subprocess 100 extends the duration of the prediction data with respect to that deviation (116).

The types of SBAS performance deviations that the short-term monitor 48 detects, and for which it generates adjusted prediction data, include deviations caused by conditions such as ionospheric storms, SBAS reference station outages, and temporarily elevation of residual error bounds by SBAS internal integrity monitors.

Referring back to FIG. 3, process 70 determines if adjusted predictions exists (120). If adjusted predictions do exist, process 70 uses the adjusted predictions (122). If the adjusted predictions do not exist, process 70 uses normal values for the predictions (124).

Process 70 may be used to predict future performance of the navigation augmentation system continuously so that a rolling window, for example, from the present time out 24 hrs, may be continuously updated to give users a perspective of the navigation augmentation system's behavior in the near future.

Referring back to FIG. 2, the frame generator module 56 assembles frame data, which include all the data needed to determine integrity bounds for GPS and SBAS users at any time within the prediction time window. Frame data assembled by the frame generator module 56 are routed to the user integrity evaluation module 58. The frame data include satellite data obtained from the satellite prediction module 34, consisting of the location and health status of each GPS and SBAS GEO satellite. The frame data also include integrity data obtained from the integrity prediction module 44, consisting of the UDREI and MT28values for each GPS and SBAS GEO satellite, as generated by each SBAS GEO satellite, and the GIVEI of each IGP, as generated by each SBAS GEO satellite. The frame generator module 56 includes a frame schedule database 57 that indicates which time frames throughout the prediction time window need to be evaluated. The frame generator module 56 uses the frame schedule database 57 to ensure that integrity evaluation results are generated for all prediction time frames that need to be evaluated.

The user integrity evaluation module 58 uses the frame data received from the frame generator module 56 to calculate GPS and SBAS integrity bounds at a large number of locations (e.g., 100,000) throughout a wide geographical area. Each location represents an emulated GPS and SBAS user. Because integrity bounds vary for users at different locations, the integrity bounds for each emulated user are calculated separately, using the same algorithms that would be used by actual GPS and SBAS receivers at the user's location. Using emulated users to calculate integrity bounds is a practical approach for determining the integrity bounds for users distributed throughout a wide geographic area, compared to an approach requiring installing, controlling, and monitoring a large number of actual GPS and SBAS receivers distributed at user locations throughout the area. The integrity bounds computed for all of the emulated users are routed to the service availability monitor module 60.

Computing the integrity bounds for a large number of emulated users may require a substantial amount of processing time. In order to increase the throughput of the integrity bound calculations, the system may include more than one user integrity evaluation module 58 that execute in parallel on separate processors.

The service availability monitor module 60 determines, based on the integrity bounds received, the availability of each of the several GPS and SBAS based navigation services at a given time (e.g., past, present, or future) at locations throughout the geographical area. The service availability monitor module 60 manages a monitored area database 64, which includes definitions of geographic areas (e.g., locations, regions, routes or flight plans) that are monitored for availability of GPS and SBAS navigation services. The service availability monitor module 60 it detects the time and duration of GPS and SBAS navigation service availability outages that are predicted to occur within each of the monitored areas. Information about the predicted navigation services outages for all monitored areas is stored in the service outage database 66.

A user interface 60 renders displays and generates reports such as geographic contour displays showing data such as integrity bounds and navigation service availability at different times throughout a wide geographic area, and list displays showing data such as predicted navigation service availability outages for different sets of monitored areas. The user interface 60 may include capabilities such as to update GPS and GEO satellite outage schedules, and to support generation of NOTAMS (i.e., official warnings of upcoming navigation service availability outages). The user interface 60 may be a monitor or a printer, for example.

Figure 6:
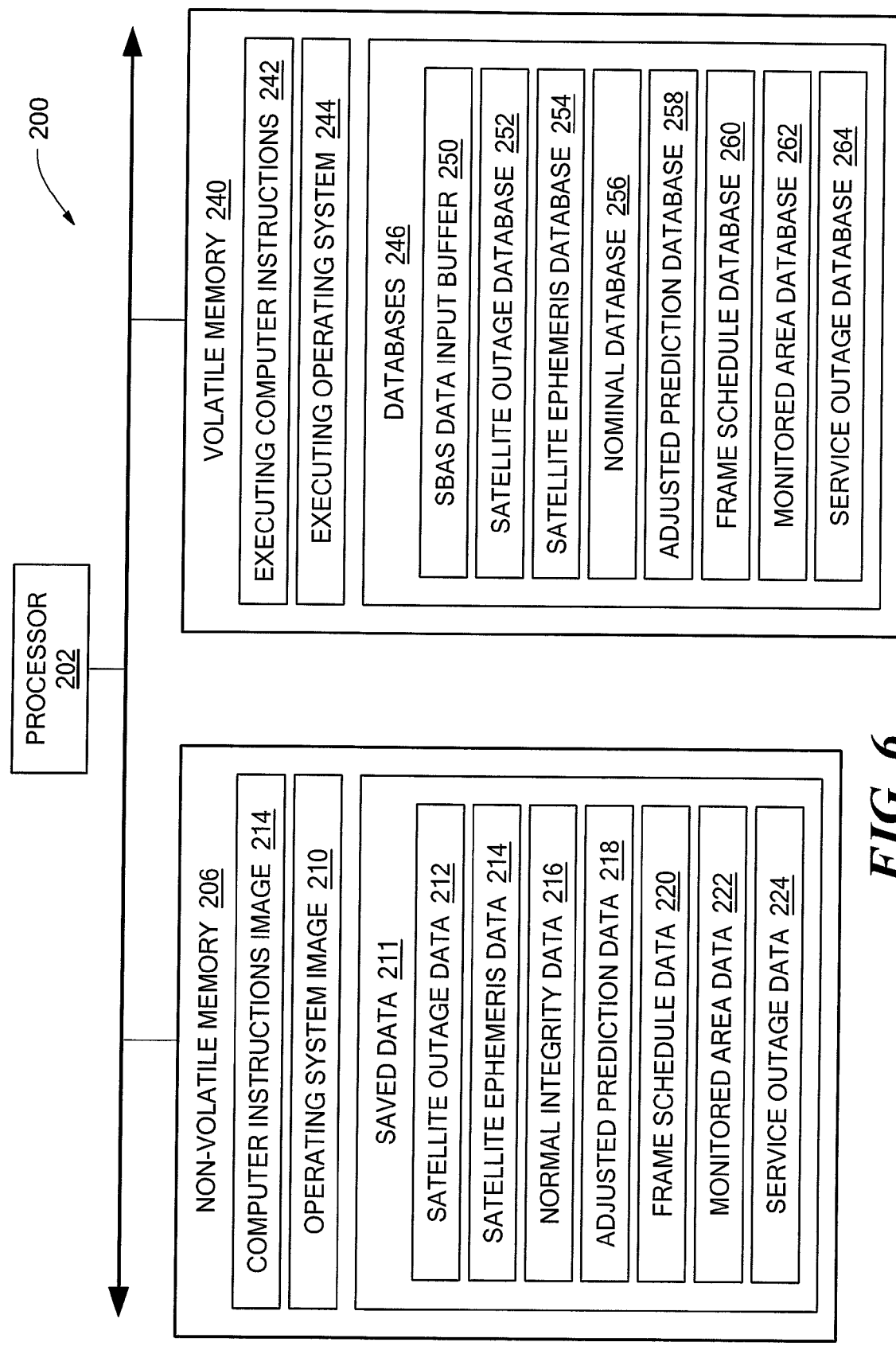
FIG. 6 is a block diagram of a computer system on which the process of FIG. 3 may be implemented.

FIG. 6 shows a computer 200, which may be used to execute process 70. Computer 200 includes a processor 202, a volatile memory 204 and a non-volatile memory 206 (e.g., hard disk). Non-volatile memory 206 may include images for the operating system 210 and computer instructions 214 for process 70. Non-volatile memory 206 may also include saved data 211, which may be loaded into volatile memory to initialize the contents of databases upon starting the execution of process 70. The saved data 211 may include satellite outage data 212, satellite ephemeris data 214, normal integrity data 216, adjusted prediction data 218, frame schedule data 220, monitored area data 222, and service outage data 224. Volatile memory 240 may include an executing operating system 244, computer instructions 242 for process 70 and databases 246 used by the executing process 70. The databases may include an SBAS data input buffer 250, a satellite outage database 252, a satellite ephemeris database 254, a nominal database 256, an adjusted prediction database 258, a frame schedule database 260, a monitored area database 262, and a service outage database 264.

Process 70 is not limited to use with the hardware and software of FIG. 6; it may find applicability in any computing or processing environment and with any type of machine or set of machines that is capable of running a computer program. Process 70 may be implemented in hardware, software, or a combination of the two. Process 70 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 70 and to generate output information.

The system may be implemented, at least in part, via a computer program product, (i.e., a computer program tangibly embodied in an information carrier (e.g., in a machine-readable storage device or in a propagated signal)), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 70. Subprocesses 80 and 100 may also be implemented as a machine-readable storage medium, configured with a computer program, where upon execution, instructions in the computer program cause the computer to operate in accordance with process 70.

The processes described herein are not limited to the specific embodiments described herein. For example, the processes are not limited to the specific processing order of FIGS. 3 to 5. Rather, any of the blocks of FIGS. 3 to 5 may be re-ordered, combined or removed, as necessary, to achieve the results set forth above.

The system described herein is not limited to use with the hardware and software described above. The system may be implemented in digital electronic circuitry, or in computer hardware, firmware, software, or in combinations thereof.

Method steps associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

The system is not limited to the specific examples described herein. For example, whereas the system described herein is within a satellite navigation system, the system may be used in any navigation system requiring the evaluation of navigation performance.

Elements of different embodiments described herein may be combined to form other embodiments not specifically set forth above. Other embodiments not specifically described herein are also within the scope of the following claims.

What is claimed is:

1. A method for determining a predicted performance of a navigation augmentation system, comprising:
    determining a normal performance of the navigation augmentation system by generating normal integrity values indicative of the normal performance over a first time interval in the past;
    comparing current integrity values with the normal integrity values and updating the normal integrity values to account for differences between the normal integrity values and the current integrity values that are consistently repeated; and
    determining predicted integrity values indicating a future performance of the navigation augmentation system over a second time interval in the future by comparing the normal integrity values with the current integrity values to determine if a deviation exists and if a deviation does not exist using the normal integrity values to determine the predicted integrity values and if the deviation does exist determining the predicted integrity values based on a deviation, the first time interval being a longer time interval than the second time interval,
    wherein determining the predicted integrity values based on the deviation comprises predicting a likely progression of the deviation by matching characteristics of the deviation against a set of known deviation patterns.

2. The method of claim 1 wherein determining the normal performance of the navigation augmentation system comprises storing the current integrity values comprising at least one of user differential range error indicator (UDREI), clock ephemeris covariance matrix data or grid ionospheric vertical error indicator (GIVEI) data.

3. The method of claim 1 wherein determining the predicted integrity values based on the deviation comprises generating adjusted data indicating a predicted magnitude and a predicted duration of the deviation.

4. The method of claim 1 further comprising storing scheduled satellite unavailability.

5. A system for determining a predicted performance of a navigation augmentation system, comprising:
    a first monitor configured to:
        determine a normal performance of the navigation augmentation system by generating normal integrity values indicative of the normal performance over a first time interval in the past;
        compare current integrity values with the normal integrity values;
        update the normal integrity values to account for differences of the normal integrity values from the current integrity values that are consistently repeated; and
    a second monitor configured to determine predicted integrity values indicating future performance of the navigation augmentation system based on the normal performance of the navigation augmentation system over a second time interval in the future by comparing the normal integrity values with the current integrity values to determine if a deviation exists and if a deviation does not exist using the normal integrity values to determine the predicted integrity values and if a deviation does exist determining the predicted integrity values based on the deviation, the first time interval being a longer time interval than the second time interval.

6. The system of claim 5 wherein the first monitor stores integrity values comprising at least one of user differential range error indicator (UDREI), clock ephemeris covariance matrix data or grid ionospheric vertical error indicator (GIVEI) data.

7. The system of claim 5 wherein the second monitor:
    predicts a likely progression of the deviation by matching characteristics of the deviation against a set of known deviation patterns.

8. The system of claim 5 wherein the second monitor generates adjusted data reflecting a predicted magnitude and a predicted duration of the deviation.

9. The system of claim 5, further comprising a satellite prediction module for determining a location of satellites and providing the location of the satellites to the first monitor, the satellite prediction module comprising a scheduled satellite unavailability database.

10. An article comprising a machine-readable medium that stores executable instructions for determining a predicted performance of a navigation augmentation system, the instructions causing a machine to:
    determine a normal performance of the navigation augmentation system by generating normal integrity values indicative of the normal performance over a first time interval in the past;
    compare current integrity values with the normal integrity values and updating the normal integrity values to account for differences between the normal integrity values and the current integrity values that are consistently repeated; and
    determine predicted integrity values indicating a future performance of the navigation augmentation system over a second time interval in the future by comparing the normal integrity values with the current integrity values to determine if a deviation exists and if a deviation does not exist using the normal integrity values to determine the predicted integrity values and if a deviation does exist determining the predicted integrity values based on the deviation, the first time interval being a longer time interval than the second time interval.

11. The article of claim 10 wherein the instructions causing a machine to determine the predicted integrity values based on the deviation comprise instructions causing a machine to predict a likely progression of the deviation by matching characteristics of the deviation against a set of known deviation patterns.

12. The article of claim 11 wherein the instructions causing a machine to determine the predicted integrity values based on the deviation comprise the instructions causing a machine to generate adjusted data reflecting a predicted magnitude and a predicted duration of the deviation.

13. The method of claim 3 wherein generating adjusted data indicating a predicted magnitude and a predicted duration of the deviation comprises generating adjusted data used to adjust the normal integrity values to generate the predicted integrity value.

14. The method of claim 1 wherein determining the predicted integrity values based on the deviation further comprises monitoring the deviation.

15. The method of claim 14 wherein determining the predicted integrity values based on the deviation further comprises:
   determining if the deviation has ceased; and
   if the deviation has ceased, rescinding the adjusted data.

16. The method of claim 15 wherein determining the predicted integrity values based on the deviation further comprises, if the deviation has not ceased, determining if the deviation will end and if the deviation will end extending the duration of the adjusted data.

17. The system of claim 8 the second monitor is configured to generate the adjusted data used to adjust the normal integrity values to generate the predicted integrity value.

18. The system of claim 8 wherein the second monitor is configured to monitor the deviation.

19. The system of claim 18 wherein the second monitor is configured to determine the predicted integrity values based on the deviation by determining if the deviation has ceased and if the deviation has ceased, rescinding the adjusted data.

20. The system of claim 19 wherein the second monitor is configured, if the deviation has not ceased, to determine if the deviation will end and if the deviation will end extending the duration of the adjusted data.

21. The article of claim 12 wherein instructions causing a machine to generate adjusted data indicating a predicted magnitude and a predicted duration of the deviation comprise instructions to generate adjusted data used to adjust the normal integrity values to generate the predicted integrity value.

22. The article of claim 12 wherein instructions causing a machine to determine the predicted integrity values based on the deviation further comprise instructions causing a machine to monitor the deviation.

23. The article of claim 22 wherein instructions causing a machine to determine the predicted integrity values based on the deviation further comprise instructions causing a machine to:
   determine if the deviation has ceased; and
   if the deviation has ceased, rescind the adjusted data.

24. The article of claim 23 wherein instructions causing a machine to determine the predicted integrity values based on the deviation further comprise instructions causing a machine, if the deviation has not ceased, to determine if the deviation will end and if the deviation will end extending the duration of the adjusted data.

* * * * *

UNITED STATES PATENT AND TRADEMARK OFFICE
CERTIFICATE OF CORRECTION

| | |
|---|---|
| PATENT NO. | : 7,423,582 B2 |
| APPLICATION NO. | : 11/305172 |
| DATED | : September 9, 2008 |
| INVENTOR(S) | : James E. Holderle et al. |

It is certified that error appears in the above-identified patent and that said Letters Patent is hereby corrected as shown below:

Col. 3, line 28, delete "bound" and replace with -- bounds --.

Col. 3, lines 49-50, delete "augmentation and" and replace with -- augmentation system and --.

Col. 7, line 35, delete "an adjusted" and replace with -- adjusted --.

Col. 7, line 49, delete "prediction" and replace with -- predictions --.

Col. 7, line 59, delete "prediction" and replace with -- predictions --.

Col. 7, line 65, delete "prediction" and replace with -- predictions --.

Col. 8, line 1, delete "prediction" and replace with -- predictions --.

Col. 8, line 64, delete "temporarily" and replace with -- temporary --.

Col. 9, line 20, delete "MT28values" and replace with -- MT28 values --.

Col. 9, line 62, delete "module 60 it detects" and replace with -- module 60 detects --.

Col. 10, line 4, delete "list" and replace with -- lists --.

Col. 14, line 1, delete "system 8 the" and replace with -- system 8 wherein the --.

UNITED STATES PATENT AND TRADEMARK OFFICE
CERTIFICATE OF CORRECTION

PATENT NO. : 7,423,582 B2
APPLICATION NO. : 11/305172
DATED : September 9, 2008
INVENTOR(S) : James E. Holderle et al.

It is certified that error appears in the above-identified patent and that said Letters Patent is hereby corrected as shown below:

Col. 14, line 18, delete "value." and replace with -- values. --.

Signed and Sealed this

Second Day of December, 2008

JON W. DUDAS
*Director of the United States Patent and Trademark Office*